US006616731B1

(12) United States Patent
Hillstrom

(10) Patent No.: US 6,616,731 B1
(45) Date of Patent: Sep. 9, 2003

(54) METHOD AND ARRANGEMENT TO MONITOR A FATTY OIL TREATMENT PROCESS CARRIED THROUGH UNDER VACUUM

(75) Inventor: Anders Hillstrom, Huddinge (SE)

(73) Assignee: Alfa Laval AB, Tumba (SE)

( * ) Notice: Subject to any disclaimer, the term of this patent is extended or adjusted under 35 U.S.C. 154(b) by 0 days.

(21) Appl. No.: 09/831,531

(22) PCT Filed: Nov. 10, 1999

(86) PCT No.: PCT/SE99/02042

§ 371 (c)(1), (2), (4) Date: Jul. 2, 2001

(87) PCT Pub. No.: WO00/29526

PCT Pub. Date: May 25, 2000

(30) Foreign Application Priority Data

Nov. 13, 1998 (SE) .............................................. 9803885

(51) Int. Cl.[7] ................................................ B01D 19/00

(52) U.S. Cl. ............................... 95/23; 95/241; 95/266; 96/155; 96/193; 96/422

(58) Field of Search ............................ 95/8, 11, 12, 23, 95/241, 266; 96/397, 399, 422, 155, 156, 193

(56) References Cited

U.S. PATENT DOCUMENTS 3,999,966 A 12/1976 Naylor
4,072,482 A * 2/1978 Aoki et al.
5,865,205 A * 2/1999 Wilmer
6,117,214 A * 9/2000 Peter et al.
6,413,297 B1 * 7/2002 Morgan et al.

FOREIGN PATENT DOCUMENTS

| | | | |
|---|---|---|---|
| EP | 0 513 739 | B1 | 12/1992 |
| GB | 2139242 | A | 11/1984 |
| WO | WO 95/33809 | A1 | 12/1995 |
| WO | WO 98/00484 | A1 | 1/1998 |

* cited by examiner

*Primary Examiner*—Duane S. Smith
(74) *Attorney, Agent, or Firm*—McCormick, Paulding & Huber LLP

(57) ABSTRACT

The present invention is a method and apparatus for monitoring the vacuum conditions for the treatment of vegetable or animal oil. During the treatment, a number of processes, such as refining, bleaching and/or deodorization, are carried out under a vacuum. The vacuum is maintained by a vacuum system, comprised of at least one vacuum creating means and at least one condenser, and a pump arranged at the outlet of the condenser. The condenser is connected to a mass flow meter monitoring the flow of a gas and generates a signal receivable by a controller. The method of monitoring the vacuum system, using the above apparatus, includes the steps of sensing, and registering the mass flow of non-condensable gas out of the vacuum system. An alarm is triggered when the amount of gas exiting the vacuum system differs from a set value.

3 Claims, 1 Drawing Sheet

METHOD AND ARRANGEMENT TO MONITOR A FATTY OIL TREATMENT PROCESS CARRIED THROUGH UNDER VACUUM

FIELD OF THE INVENTION

The present invention relates to a method to monitor a process for treatment of vegetable or animal oils such as refining, bleaching or deodorization, in which process a number of process steps are carried through under vacuum created by a vacuum system. The invention also relates to an arrangement to carry through the proposed method.

BACKGROUND OF THE PRESENT INVENTION

When producing vegetable or animal oils from different raw materials there are usually a number of process steps, where the oil is treated under vacuum with or without stripping gas. The aim of these process steps is to remove substances that impart disagreeable odours and taste. These substances may have been formed during different earlier treatment steps or may have been present already in the cruel oil. The result of this vacuum treatment is to a high degree dependent on really obtaining the desired vacuum level. The vessels in which the vacuum treatment takes place are usually of imposing size. A large plant may for example have a vessel with a height of 35 meters and a diameter of 3 meter. Usually, the vacuum vessels are provided with vacuum meters to control the vacuum.

Often a number of vacuum vessels, in which the oil is treated, are connected to a common vacuum source. This may consist of a vacuum system comprising vacuum generating means and condensers. The vacuum generating means may consist of a vacuum pump or of a steam ejector. In large plants a number of steam ejectors with intermediate condensers are often used. The condenser is chilled with water, distillate or some other suitable liquid in order to achieve condensing of condensable gases.

In EP 513 739 there is shown a deodorization system with vacuum boosters and condensers, which equipment makes it possible to reach the high vacuum that is necessary for carrying through the treatment. According to this prior art the non-condensable gases are discharged to the atmosphere.

The vacuum system operates to achieve a vacuum level of 0,5–6 mbar in the different vessels and heat exchangers used during the treatment of the fatty oil. The added stripping gas as well as dissolved gases in the oil and various compounds formed during the treatment are removed from the treatment vessels.

An efficient treatment of the fatty oils requires the mentioned vacuum levels. The vacuum value is usually monitored by a pressure sensor. Working at this high vacuum means that the instrument used for sensing the pressure firstly must be evacuated to absolute vacuum and that the pressure in the vessel is then measured in relation to absolute vacuum.

Some leakage in the equipment or in the pumps or valves, which are necessary to build up the plant, will result in problems to obtain the desired vacuum value. Air leaking into the vessel will also cause undesired oxidation and may lead to spoiled products.

One aim of the present invention is to bring about an accurate and rapid control of the vacuum value in the equipment, another to make it possible to obtain an early detection of any faults in the vacuum system. The present invention also means that start-up of a plant may be done in a much shorter time than according to prior art.

SUMMARY OF THE PRESENT INVENTION

According to the method of the present invention it is now proposed that the mass flow of non-condensable gas out from the vacuum system is controlled and registered. During steady-state operation in a tight plant the mass flow through the mass flow meter will be constant. The stripping gas is added in a known and constant amount. If the stripping gas consists of steam it is condensed in the condensers in the vacuum system. If some inert gas is used for stripping the flow of non-condensable gas will be greater but the value will be a constant one if the equipment functions.

An arrangement in a plant for carrying through the method according to the invention comprises a vacuum system with at least one vacuum creating means and at least one condenser and a mass flow meter for gas, which by way of a pump is connected to the last condenser in the vacuum system. Mass flow meters of a suitable kind are available on the market.

According to the method of the invention it is possible to control the amount of gas which passes the mass flow meter all the time. During operation conditions the mass flow is constant and represents the content of non-condensable gases in the stripping gas. Should this value be changed but the pressure remain constant there is a leakage somewhere in the plant.

When the plant is new or shall be started again after a stop the vessels and other equipment put under vacuum is evacuated, after which the vacuum system is cut off. If there is an increase in pressure there is a leakage in the plant. Often one starts by controlling each separate vacuum vessel and thereafter the whole plant. This is circumstantial and may demand from some days up to several weeks in leak searching if the tests must be redone.

According to the method of the invention the evacuation process may be controlled and if the pressure (in relation to the mass flow) in the equipment is not lowered at the rate, which may be expected knowing the capacity of the vacuum system, one obtains an early indication that there is a leakage somewhere or there is something wrong with the vacuum system.

The proposed method gives alarm far more early than the generally used method of monitoring only the pressure.

BRIEF DESCRIPTION OF THE DRAWING

The proposed invention is described further with reference to a deodorization plant chosen as an example only, which plant is schematically illustrated in FIG. 1.

DETAILED DESCRIPTION OF THE PREFERRED EMBODIMENT

Figure 1:
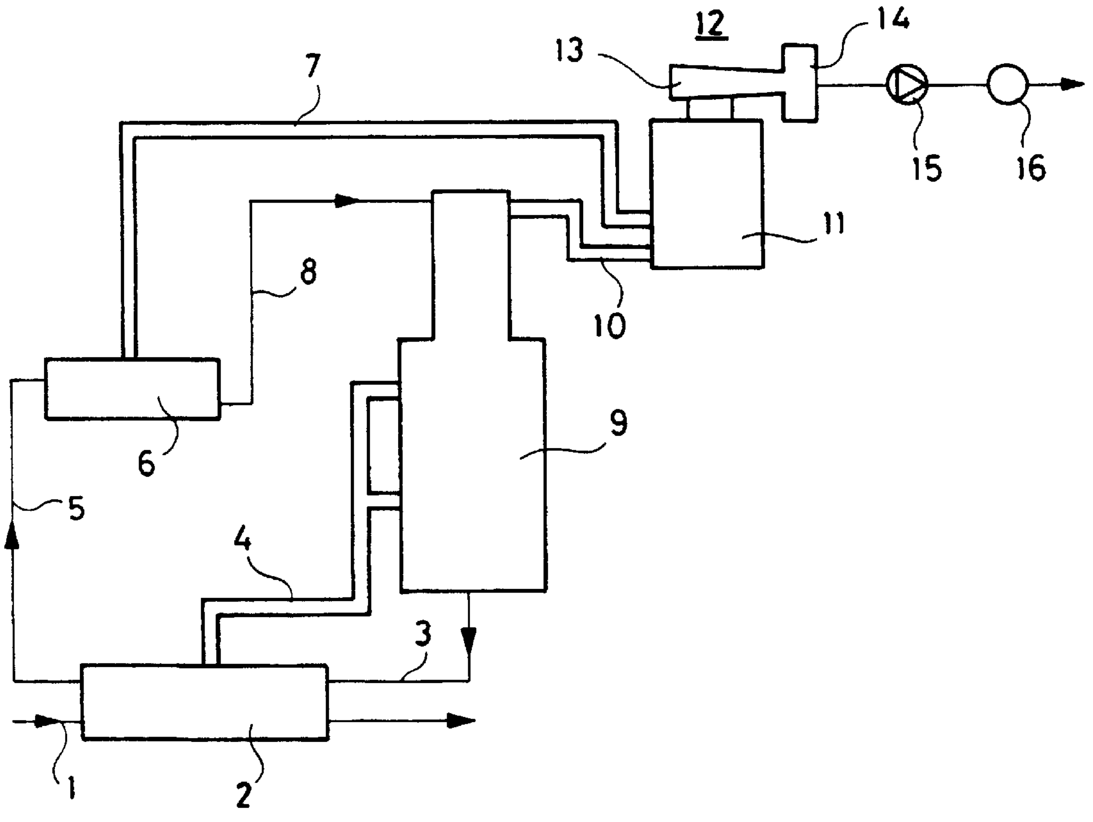

The Alfa Laval deodorization plant, which is shown very schematically, only shows equipment, which is of importance in connection with the invention. Neither pumps, valves, all heat exchangers, stripping equipment nor control equipment are shown.

Oil 1, which is to be treated in the plant, is preheated in a heat exchanger 2 by treated oil 3 with a high temperature, which oil has been treated in the plant. The arriving oil flows through the heat exchanger in tubes, which are surrounded by treated oil, which is therefore chilled. Stripping gas, steam or some inert gas is injected into the treated oil. The gas leaves through a tube 4, which is connected to the vacuum system. The preheated oil 5 is directed further to an additional heat exchanger 6, where the oil is heated to a desired high temperature by means of steam. Also in this heat exchanger stripping gas, which is evacuated by way of tube 7, is added. The heated oil 8 is directed to the deodorization column 9 from the heat exchanger 6.

In this column 9 oil flows downward firstly through an upper space filled with a structured packing material and then through a number of trays in the lower part of the vessel. Also in this column the oil is treated with stripping gas in a number of places in the column. The deodorization column 9 is evacuated by way of a tube 10. The tube 4 leads to the deodorization column 9 and the heat exchanger 2 is consequently evacuated by way of the column 9. The tubes 7 and 10 lead to a vessel 11, which is chilled by distillate and in which oil having followed the gas stream is condensed.

This vessel 11 is connected to the vacuum system 12, which for the sake of simplicity is shown consisting only of one steam ejector and one condenser 14. Usually, the desired vacuum value in the plant is achieved by a number of steps each comprising a steam ejector and a condenser. At the outlet of the condenser 14 there is a pump 15 which transports non-condensable gases to a mass flow meter 16. This mass flow meter senses the amount of gas, which leaves the plant. The amount of gas is registered and if the amount of gas increases there will be an alarm. An increased gas flow during treatment of the oil indicates that there is something wrong with the equipment or with the processing conditions.

What is claimed is:

1. A method to monitor the vacuum conditions in equipment during the processes of refining, bleaching and/or deodorization, during which treatment a number of process steps are carried through under vacuum achieved by a vacuum system, the method including the steps of sensing the mass flow of non-condensable gas out from the vacuum system; and registering the mass flow of non-condensable gas out of the vacuum system for the treatment of vegetable or animal oil.

2. Method according to claim 1, including the further steps of triggering an alarm when an amount of gas differing from a set value during operation conditions is detected.

3. Apparatus for carrying out the method of claim 1, said apparatus comprising equipment which is kept under vacuum by a vacuum system (12) having at least one vacuum creating means (13) and at least one condenser (14), and a pump (15) arranged at the outlet of the condenser which is connected to a mass flow meter (16) monitoring the mass flow of a gas and generating signals receivable by a controller in response thereto.

* * * * *